March 1, 1938.  T. R. FLESHER  2,109,959
LIGHT RAY DIRECTOR
Filed Nov. 13, 1935
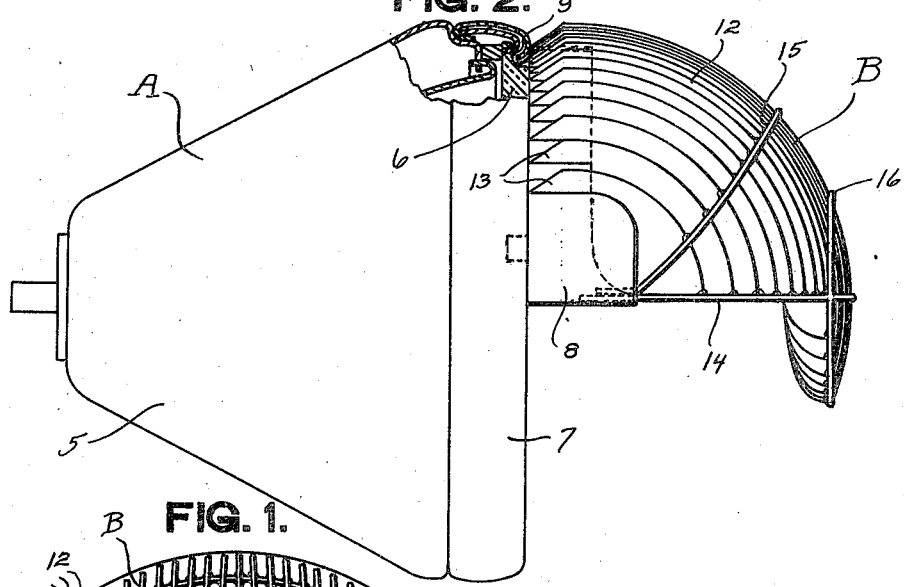
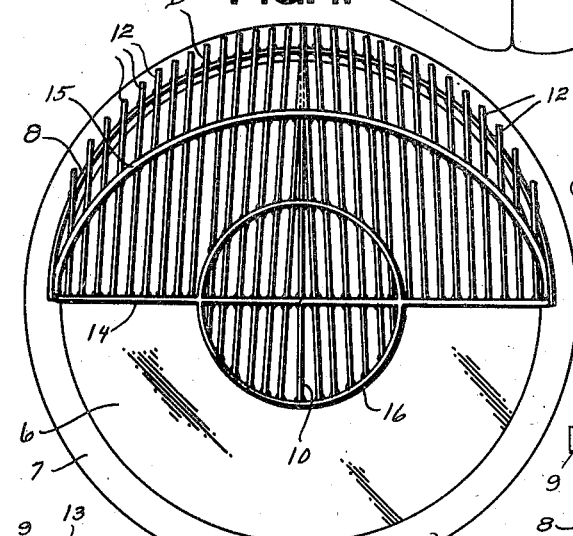
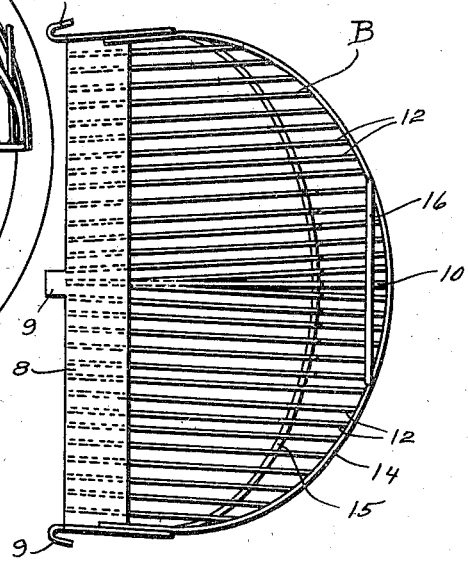
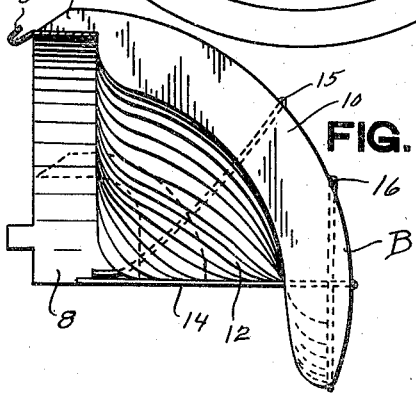
INVENTOR,
Thomas R. Flesher
BY Lancaster, Allwine and Rommel
ATTORNEYS Patented Mar. 1, 1938

2,109,959

UNITED STATES PATENT OFFICE 2,109,959

LIGHT RAY DIRECTOR

Thomas R. Flesher, McAlester, Okla.

Application November 13, 1935, Serial No. 49,616

6 Claims. (Cl. 240—48.4)

The present invention relates to a light ray director for vehicle headlights and the primary object of the invention is to provide a headlight attachment which will direct the rays of the main beam straight forward and prevent spreading of the beam.

A further object of the invention is to provide a vehicle headlight attachment which will prevent the rays of light leaving the headlight from objectionably spreading and blinding drivers of approaching vehicles and yet permit proper illumination of the road.

A further object of the invention is to provide a light ray director adapted to be positioned over the upper half of a headlight for directing the light rays from the upper portion of the light into a more narrow forwardly directed beam, and allowing the light rays from the lower half of the light to spread laterally for illuminating the side of the road immediately in front of the vehicle.

A further object is to provide a device of this character which may be easily and securely attached to vehicle headlights, and which is of such shape as to permit ready cleaning of the headlight lens without removing the device.

Other objects and advantages of the invention will be apparent from the following detailed description, taken in connection with the accompanying drawing, forming a part of this specification and in which drawing:—

Figure 1 is a view in front elevation showing the light ray director applied to a vehicle headlight.

Figure 2 is a side view of the director shown attached to a headlight.

Figure 3 is a bottom plan view of the director; and

Figure 4 is a central vertical section thru the director.

In the drawing and wherein like reference characters designate corresponding parts thruout the several views, the letter A designates a vehicle headlight and B the light ray director attachment.

The headlight A is of usual construction, embodying the casing 5 having the lens 6 secured in position over the front of the casing by the removable rim 7. This rim 7 is formed with the usual inturned lens engaging bead about its forward edge and this bead provides means for securing the attachment to the headlight in a manner to be subsequently described.

Referring now to the construction of the light ray director B, the same is adapted to be positioned over the upper half of the front of the headlight and may either be formed of metal or any other suitable material and be of various colors to harmonize with the headlight or the vehicle finish. The device B comprises a semicircular shaped base member 8 provided about its rear edge with preferably three bendable attaching clips 9 which are adapted to be clamped beneath the inturned bead of the rim 7 for securing the light director to the headlight.

Secured at their rear upper portions to the base member 8 is a plurality of light director blades arranged substantially parallel to the light beam whereby the light rays from the upper portion of the headlight will be prevented from spreading laterally and be directed straight forwardly between the blades. This blade assembly embodies a central vertical blade 10 having a group of blades 12 at each side thereof with the blades of each group arranged in parallel spaced apart relation and the blades of the groups slightly inclined in upwardly converging relation toward the central vertical blade as clearly shown in Figure 1. Each of the blades 10 and 12 is provided at its rear upper end with an extension 13 which overlies and is secured to the outer surface of the base member 8 in any suitable manner such as by soldering or the like. These extensions 13 as will be observed in Figures 2 and 4 have their ends beveled off for presenting a better appearance and eliminating sharp corners. By slightly inclining the groups of blades 12 in upwardly converging relation the light rays will be directed into a more narrow beam and allows less spreading of the beam.

Secured at its end portions to the lower ends of the base member 8 is a semi-circular shaped brace wire 14 which extends horizontally and at a right angle to the major plane of the base member across the forward margins of the blades. The forward margins of the blades 10 and 12 are secured to this brace wire whereby the blades are held in proper spaced apart relation at their forward edges. A second diagonal brace wire 15 is also extended across and secured to the outer margins of the blades at a point substantially midway between the brace wire 14 and the base member 8. Secured to the forward lower marginal portion of the blade assembly is an annular or ring brace wire 16 having its axis disposed at the point of intersection of the central vertical blade 10 and the horizontal brace wire 14 shown in Figure 1. This annular brace wire 16 is in a plane normal to the axis of the light beam and is of a diameter substantially less than that of the base member 8. As shown most clearly in Figures 1 and 4, the central vertical blade 10 and a number of the blades 12 adjacent to each side thereof extend below the horizontal brace ring 14 and have their lower extremities secured to the lower half of the annular brace wire 16. This provides a centrally disposed semi-circular shaped extension extending downwardly below the forward portion of the horizontal brace wire 14 so as to intercept the lower portion of the main central light rays from the light and direct the rays straight forward.

Referring now to the specific configuration of the blade assembly, the curved outer margins of the plates form a sphere having its center in the axis of the light beam from the headlight. The central vertical blade 10 is the longest of the blades and is substantially crescent-shape providing an inner concaved edge which is rounded off at each end as clearly shown in Figure 4. The radius of curvature of the outer edges of the blades gradually decreases from the central blade 10 to the outer end blades as shown in Figure 2, while the inner edges of the blades gradually change from concave at the central blade 10 to convex at the outer end blades as shown in Figure 4. The inner edges of the blades 12 are also rounded off at each end and this rounding off of the ends of the blades eliminates any sharp corners such as would cause injury to a person's hand when cleaning the headlight lens 6. The specific formation of the blades at their inner edges not only provides a hollow space permitting ready cleaning of the headlight lens without removing the light director from the headlight, but also forms narrow reflecting surfaces as shown in Figure 4 which will direct some light rays laterally upon the road immediately in front of the vehicle.

Changes in detail may be made to the form of invention herein shown and described, without departing from the spirit of the invention or the scope of the following claims.

I claim:

1. A light ray director for headlights, comprising an attaching base member, and a hollow quadri-spherical shaped blade assembly secured to the base member embodying a central vertical arcuate blade and a group of parallel spaced apart blades at each side of the central blade arranged in slightly upwardly converging relation toward the central blade and decreasing in length away from the central blade.

2. A light ray director for headlights, comprising a semi-circular shaped base member, and a hollow quadri-spherical shaped blade assembly embodying a central vertical blade secured at its rear upper end to the central portion of the base member and a group of spaced apart blades at each side of the central blade secured at their rear upper ends to the base member with the groups of blades upwardly converging toward the central blade, said blades having curved outer edges, with the radius of curvature of said edges gradually decreasing from the central blade toward the end blades of each group.

3. A light ray director for headlights, comprising a semi-circular shaped base member, and a series of substantially vertical blades secured in spaced apart relation on the base member and forming a quadri-spherical shaped assembly, said blades having curved outer edges gradually decreasing in length from the center of the series and having their inner edges gradually changing from concaved at the center of the series into convexed at each end of the series.

4. A light ray director for headlights, comprising a semi-circular shaped base member, a central vertical blade of crescent-shape secured at its rear upper end to the center of the base member, a group of parallel spaced apart blades disposed substantially vertical at each side of the central blade and secured at their rear upper portions to the base member, said groups of blades having their inner edges changing from concaved at the central blade to convexed at the ends of the base member, and means connecting the forward portions of the blades in spaced apart relation.

5. A light ray director for headlights, comprising a semi-circular shaped base member, a blade assembly embodying a series of substantially vertical blades secured in spaced apart relation at their rear portions to the base member and having curved outer edges forming a quadri-spherical outline, brace wires secured to the end portions of the base member and extending across the forward portions of the blades for holding the blades in spaced apart relation, and an annular brace ring connecting the forward portions of a number of the blades at the center of the series of blades.

6. A light ray director for headlights, comprising a semi-circular shaped base member, a series of spaced apart substantially vertical blades secured to the base member and extending forwardly therefrom in quadri-spherical form with a number of the blades at the center extending downwardly in semi-circular shape below the remaining blades, a horizontal brace wire connecting the forward portions of the blades in spaced apart relation, and an annular brace ring having its lower portion connecting the lower ends of said downwardly extending center blades.

THOMAS R. FLESHER.